United States Patent
Fang et al.

(10) Patent No.: US 10,559,233 B2
(45) Date of Patent: Feb. 11, 2020

(54) SEGMENT DISPLAY DEVICE

(71) Applicant: UBTECH Robotics Corp., Shenzhen (CN)

(72) Inventors: Xiongyuan Fang, Shenzhen (CN); Xiaochu Zhong, Shenzhen (CN); Kai Xu, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 351 days.

(21) Appl. No.: 15/600,803

(22) Filed: May 22, 2017

(65) Prior Publication Data
US 2018/0190163 A1    Jul. 5, 2018

(30) Foreign Application Priority Data
Dec. 31, 2016    (CN) .......................... 2016 1 1266126

(51) Int. Cl.
*G06F 9/302*    (2018.01)
*G09F 9/30*    (2006.01)
(Continued)

(52) U.S. Cl.
CPC .............. *G09F 9/3023* (2013.01); *G09F 9/33* (2013.01); *H02M 2001/0003* (2013.01)

(58) Field of Classification Search
CPC ........ G04C 23/04; G04C 99/00; G04C 23/02; G04C 23/00; G04C 17/0091; G04C 17/02;
(Continued)

(56) References Cited

U.S. PATENT DOCUMENTS 6,816,130 B1 *  11/2004  Shishido ................ A63B 71/06
                                                       345/2.3
9,389,592 B1 *   7/2016  Baldwin ................. G04F 8/003
                         (Continued)

FOREIGN PATENT DOCUMENTS

CN    203932551 U  * 11/2014
CN    205121175 U  *  3/2016
GB    191510067 A  *  7/1916  ............. G04C 23/22

OTHER PUBLICATIONS

Adafruit. "Solder:Time DIY watch kit". https://web.arrchive.org/web/20131015084514/https://www.adafruit.com/product/495 (Year: 2013).*

(Continued)

*Primary Examiner* — Julie Anne Watko (57) ABSTRACT

A segment display device includes: a housing including an upper, cover and a lower cover connected to the upper cover, the upper cover defining a plurality of upper connection holes and a display window, the lower cover defining a plurality of lower connection holes at positions corresponding to the upper connection holes, the upper connection holes and the lower connection holes being configured for connecting the housing, to a building block, and the housing defining an interlace opening; as circuit board arranged within the housing and including a first circuit port and a second circuit port, the first circuit port and the second circuit port being located at the interface opening; and a segment display arranged on the circuit board at a position corresponding to the display window.

9 Claims, 8 Drawing Sheets

(51) Int. Cl.
*G09G 3/04* (2006.01)
*G09F 9/302* (2006.01)
*H02M 1/00* (2006.01)
*G09F 9/33* (2006.01)

(58) Field of Classification Search
CPC ........... H02M 1/00; H02M 2001/0003; H02M 2001/0012; H02M 2001/0041; G09F 9/3023; G09F 9/302; G09F 9/30; G09F 9/00; G09F 9/33; G09G 3/14; G09G 3/12; G09G 3/06; G09G 3/04; G09G 3/00
See application file for complete search history.

(56) References Cited

U.S. PATENT DOCUMENTS

2003/0217495 A1* 11/2003 Nagamine ................. G09F 9/00
40/605
2016/0271509 A1* 9/2016 Arboleda ............. A63H 33/086

OTHER PUBLICATIONS

LEGO. "LEGO Kids' 9002144 Yellow Light Up Alarm Brick Clock". https://www.amazon.com (Year: 2019).*
Uxcell. "Kitchen Cabinet Shelf Support Pins Studs Pegs 10pcs for 5mm Hole". https://www.amazon.com (Year: 2019).*
Tinker Toys. https://web.archive.org/web/20110507091223/http://tinker-toys.conn:80 (Year: 2011).*

\* cited by examiner

SEGMENT DISPLAY DEVICE

CROSS REFERENCE TO RELATED APPLICATIONS

This application claims priority to Chinese Patent Application No. 201611266126.9 filed Dec. 31, 2016, which is hereby incorporated by reference herein as if set forth in its entirety.

BACKGROUND

1. Technical Field

The present disclosure generally relates to segment displays, and particularly to a segment display device.

2. Description of Related Art

Conventional building block robots include various modules, such as main controllers, servos, connectors and decorative components, to build a variety of different figures. The robots controlled by the servos can perform a variety of actions. The conventional building block robots have limited functions, and do not include a display module, which cannot achieve a better user experience.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
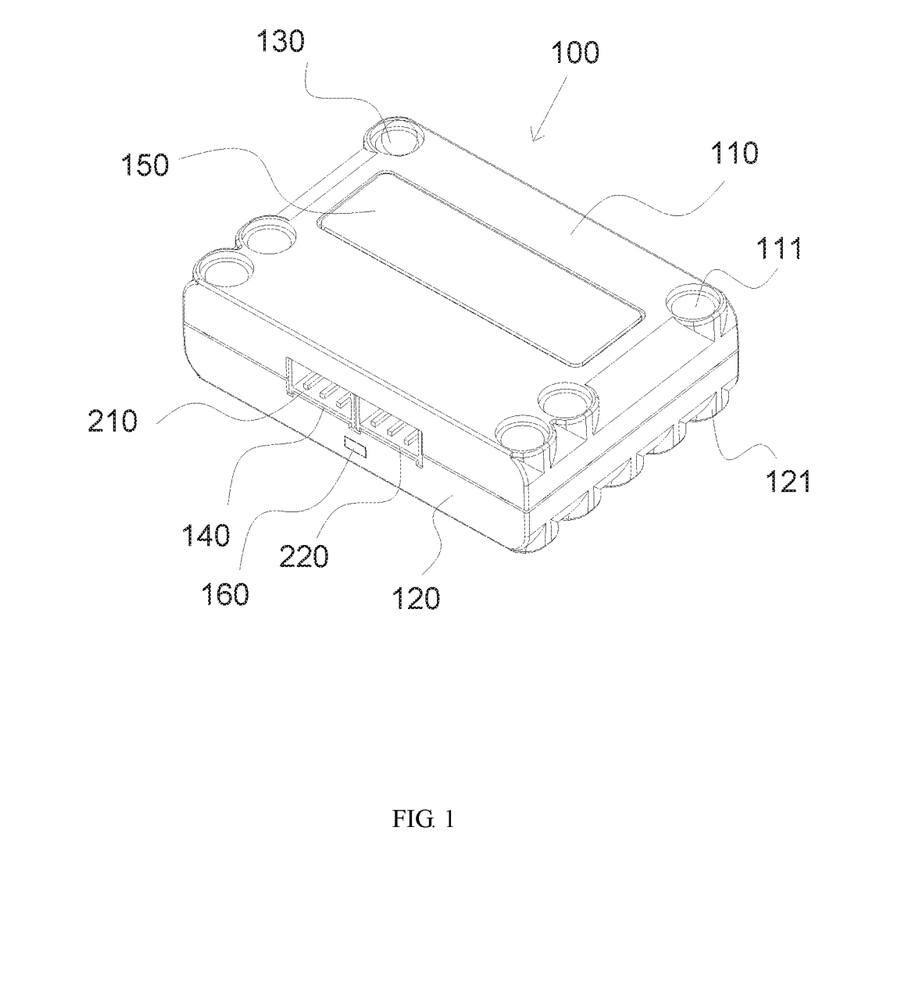
FIG. 1 is an isometric view of a segment display device according to an embodiment.
Figure 2:
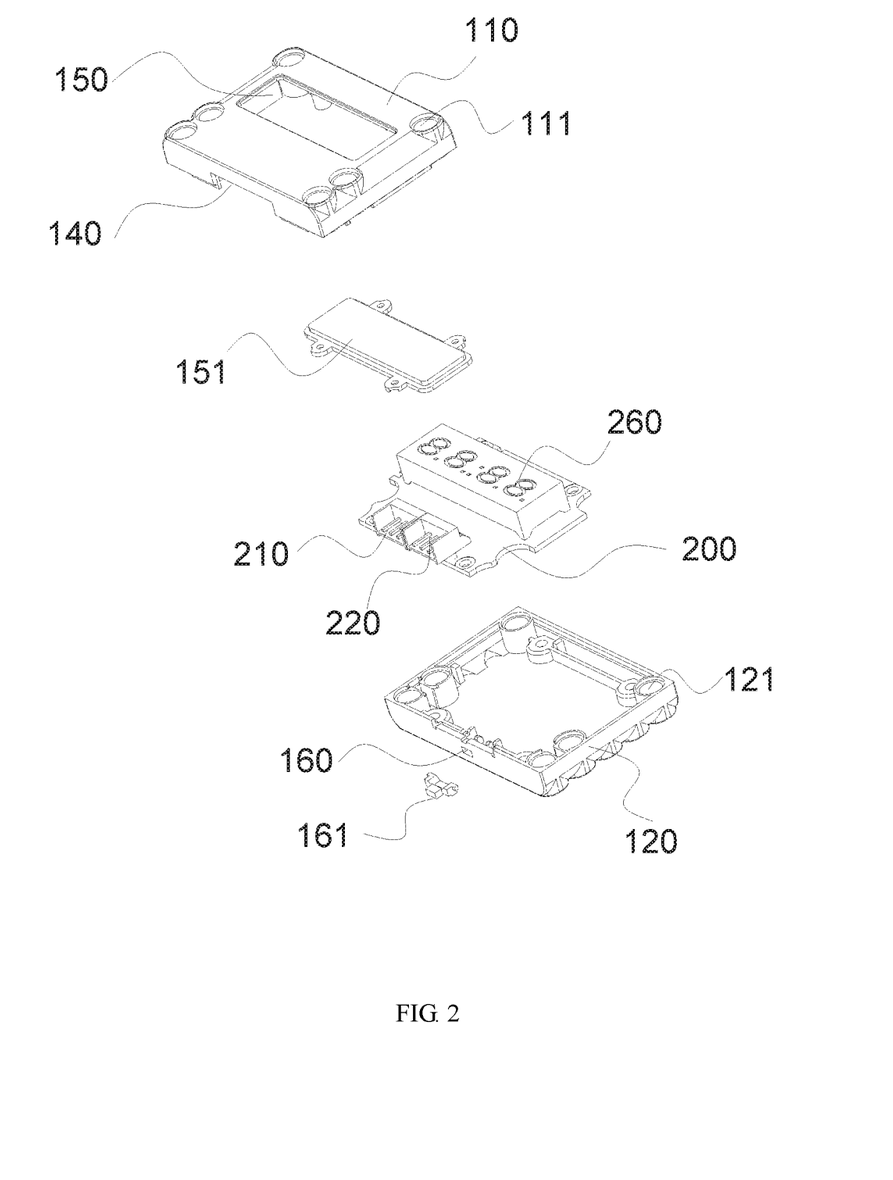
FIG. 2 is an exploded isometric view of the segment display device of FIG. 1.

Referring to FIGS. 1-2, a segment display device includes a housing 100, a circuit board 200 located within the housing 100, and a segment display 260 on the circuit board 200. The housing 100 includes an upper cover 110 and a lower cover 120 connected to the upper cover 110. The upper cover defines a number of upper connection holes 111. The lower cover 120 defines a number of lower connection holes 121 at positions corresponding to the upper connection holes 111. The upper connection holes 111 and the lower connection holes 121 are used for connecting the housing 110 to a building block. The housing defines an interface opening 140. The circuit board 200 includes a first circuit port 210 and a second circuit port 220. The first circuit port 210 and the second circuit port 220 are located at the interface opening 140. The upper cover 110 defines a display window 150. The segment display 260 is arranged at a position corresponding to the display window 150.

The present disclosure provides a segment display device for a building block robot, wherein the upper connection holes 111 and the lower connection holes 121 are provided in the segment display device. Other building blocks of the building block robot also define connection holes corresponding to the upper connection holes 111 or the lower connection holes 121. It is convenient to connect these building blocks through the connection holes. The circuit board 200 includes a first circuit port 210 and a second circuit port 220. Information from different building blocks can be displayed as needed to solve the problem that the existing building blocks are limited in function and lack a display module. The segment display device is compact, easy to connect with the building block robot, and can display multiple information.

Figure 3:
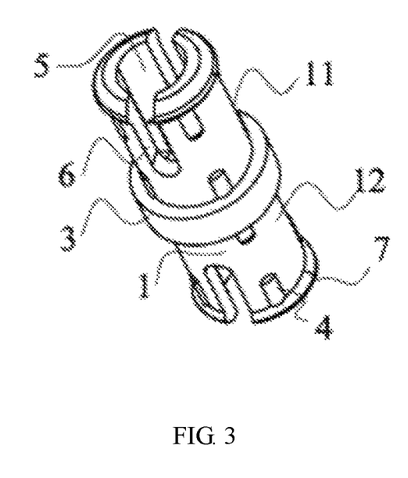
FIG. 3 is an isometric view of a connection pin of FIG. 1.

In one embodiment, the segment display device is connected to other building blocks through a number of connection pins 130. As shown in FIGS. 1 and 3, each connection pin 130 includes a connecting shaft 1 that includes a stopper shoulder 3 on a circumferential surface thereof along a circumferential direction thereof. The stopper shoulder 3 is located between opposite ends of the connecting shaft 1, and one end of each connection pin 130 is inserted into one of the upper connection holes 111 or one of the lower connection holes 121. The other end of each connection pin 130 is used to connect with a building block. The connecting shaft 1 is divided into the first shaft section 11 and the second shaft section 12 by stopper shoulder 3 in the axial direction of the connecting shaft 1. Specifically, the first shaft section 11 or the second shaft section 12 of the connection pin 130 is inserted into one upper connection hole 111 and/or one lower connection hole 121. Depending on the difference between the first shaft section 11 and the second shaft section 12, the connection pin 130 may be partially/fully inserted into the upper connecting hole 111 or the lower connecting hole 121. The other shaft section of the connecting pin 130 is used to be inserted into other building blocks to realize the connection of the segment display device and other building blocks.

The first shaft section 11 and the second shaft section 12 are respectively inserted into different building blocks so as to realize the joining of the different building blocks. The stopper shoulder 3 serves as stopper between a building block and the connecting shaft which restricts the axial movement of the building block with respect to the connecting shaft 1 and prevents the connecting shaft 1 from directly passing through the connection hole in the building block.

In one embodiment, in order to reduce the weight of the connecting shaft 1 and the material cost while further improving the flexural characteristics of the connecting shat 1, a central hole 5 is formed in the direction of the central axis of the connecting shaft 1, and the central hole 5 extends from one end of the connecting shaft 1 to the other, opposite end. And a hole (not shown) is formed in the circumferential surface of the connecting shaft 1, and communicates with the central hole 5.

In one embodiment, a number of ribs 4 are formed on the circumferential surface of the connecting shaft 1 and extend along the axial direction thereof. The number of the ribs 4 may be two or more. Several sets of ribs 4 are arranged at different positions of the connecting shaft 1. Each set includes four ribs 4 evenly arranged along the circumferential direction of the connecting shaft 1.

A number of grooves 6 are defined in the circumferential surface of the connecting shaft 1, and extends from opposite ends of the connecting shaft 1 toward the middle portion thereof. In the embodiment, there are four symmetrically arranged grooves 6. When the insertion pin 130 is inserted into one connection hole, the first shaft section 11 or the second shaft section 12 undergoes a certain degree of deformation due to the existence of the grooves 6. After the connecting shaft is put in position, a projection 7 of the connecting shaft 1 is located between the upper connection hole and the lower connection holes 121, or located at a top of the upper connection hole 111, or located at a bottom of the lower connection hole 121, depending on the length of the connecting shaft 1.

The connecting shaft 1 of each connection pin 130 includes a projection 7 at an end thereof that extends along a circumferential direction thereof. When the upper cover 110 and the lower cover 120 are connected together, a receiving space (not shown) is formed between each upper connection hole 111 and a lower connection hole 121 corresponding to the upper connection hole 111. The projection 7 of each connecting shaft 1 is received in one of the receiving spaces.

In one embodiment, the interface opening 140 includes a first opening portion and a second opening portion, and the first circuit port and the second circuit port are respectively located at the first opening portion and a second opening portion. The first circuit port and the second circuit port are exposed to the outside of the housing 100 through the first opening portion and a second opening portion. The first circuit port and the second circuit port are used to electrically connect with different building blocks.

The housing 100 defines an indicator hole 160. A light guide 161 is arranged in the indicator hole 160. The circuit board 200 includes an indicator light (not shown) that is arranged, behind the light guide 161. The indicator light is used to indicate the operation state of the segment display 260.

Figure 4:
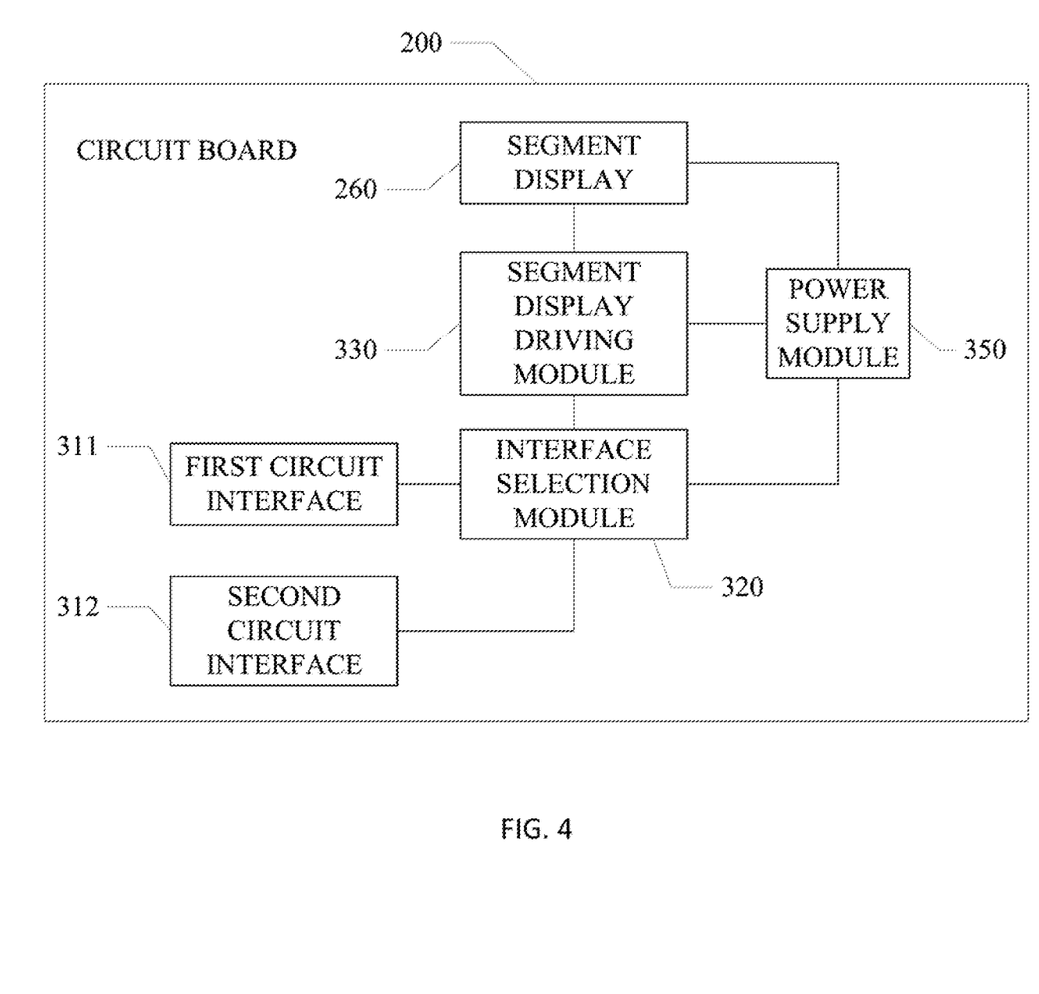
FIG. 4 is a block diagram of segment display circuit according to an embodiment.

In one embodiment, as shown in FIG. 4, the circuit board 200 includes a segment display circuit that includes a first circuit interface 311, a second circuit interface 312, an interface selection module 320, a segment display driving module 330, the segment display 260 and a power supply module 350 for supplying power to the segment display circuit. The first circuit interface 311 and the second circuit interface 312 are electrically connected to the interface selection module 320. The interface selection module 320 and the segment, display 260 are both electrically connected to the segment display driving module 330. The interface selection module 330 is used for determining whether to turn on the first circuit interlace 311 or the second circuit interface 312. The first circuit interface 311 or the second circuit interface 312 is able to be electrically connected to other building blocks, and if the received data is data to be processed or displayed by the segment display module, the corresponding processing is performed. If the data received from one of the circuit interfaces is not the data to be processed or displayed by the segment display module, the received data is sent through the other circuit interface to the building block con connected to the other circuit interface.

Figure 5A:
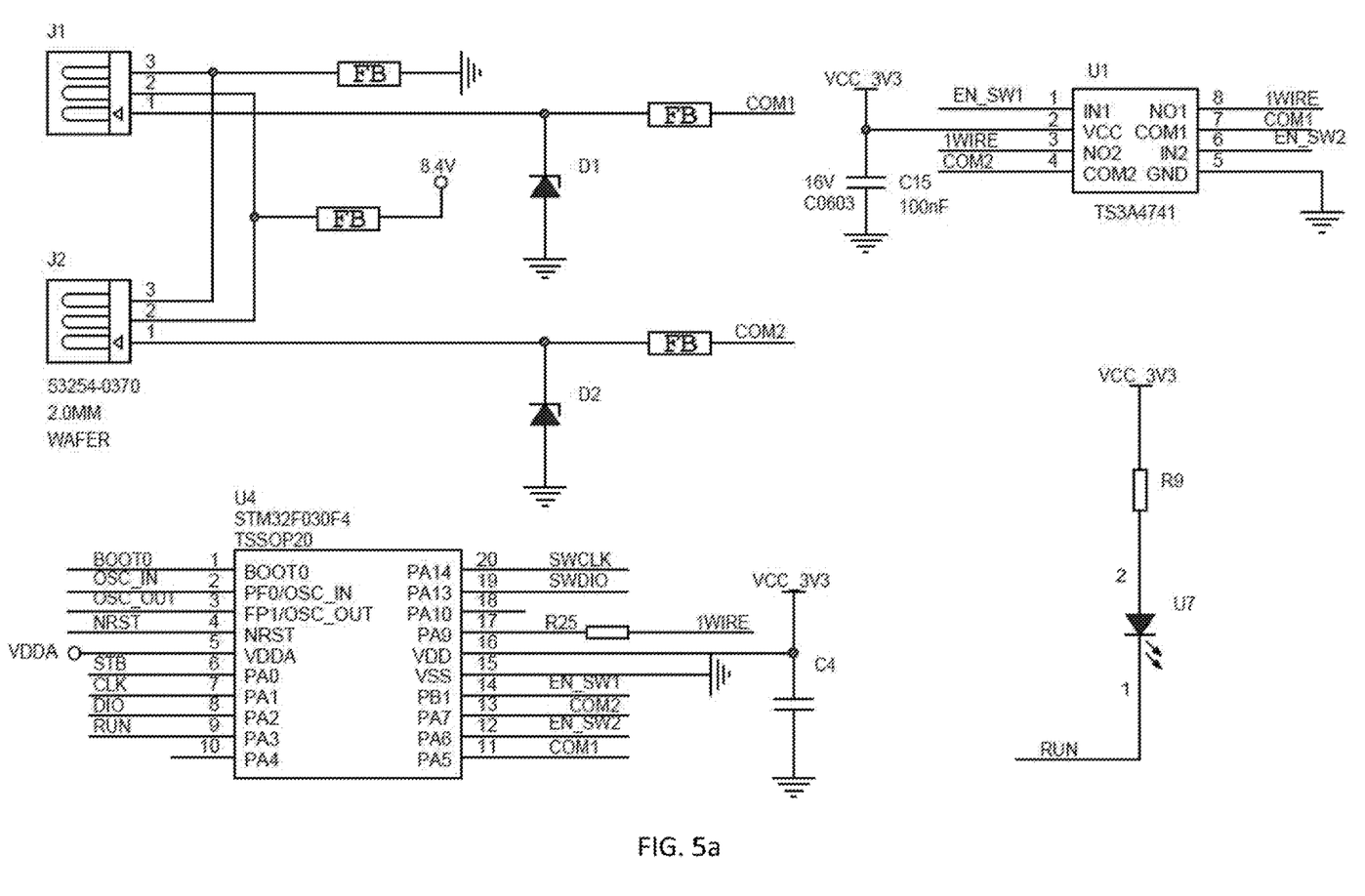
FIG. 5a is a circuit diagram of the first part of a segment display circuit according to an embodiment.

Specifically, as shown in FIG. 5a, the interface selection module 320 includes a switch chip U1 and a main control chip U4. The first circuit interface 311 includes a first data pin COM1. The second circuit interface 312 includes a second data pin COM2 connected to the signal transmission lines of the first circuit interface 210 (J1) and the second circuit interface 220 (J2). The first data pin COM1 and the second data pin COM2 are respectively connected to two input pins (pin 7 and pin 4) of the switch chip U1. Two enable pins (pin 1 and pin 6) and two output pins (pin 8 and pin 3) of the switch chip U1 are connected to the main control chip U4. The first data pin COM1 and the second data pin COM2 are connected to the main control chip U4. The main control chip U4 is used to control the switch chip U1 to enable the two output pins according to the level signals of the first data pin COM1 and the second data pin COM2. The switch chip U1 may be a 2-channel switch chip and select to turn on the interface COM1-NO1 or the interface COM2-NO2 under the control of the enable pins EN_SW1 and EN_SW2 of the main control chip U4.

The interface selection process is as follows: After power-up, the main control chip U4 detects the level of the first data pin COM1 and the second data pin COM2. If the first data pin COM1 at high level, the main control chip U4 enables only E_SW1. That is, connecting the first data pin COM1 to the output pin NO1 (pin 8) of the switch chip U1, and disconnecting the second data pin COM2 from the output pin NO2 (pin 3) of switch chip U1. The data is sent from the first data pin COM to the main control chip U4. If the data is intended to be sent to the segment display 260, it will be sent to the segment display driving module 330. If the data is not intended to be sent to the segment display 260, another data pin and output pins are turned on, and the data is sent to other building, blocks. The main control chip U4 can control via the enable pins EN_SW1 and EN_SW2 to select the turning on of the COM1-NO1 or COM2-NO2. COM1-NO1 and COM2-NO2 will not be turned on at the same time.

In one embodiment, the segment display device further includes an indicator light U7 connected to the main control chip U4.

Figure 5B:
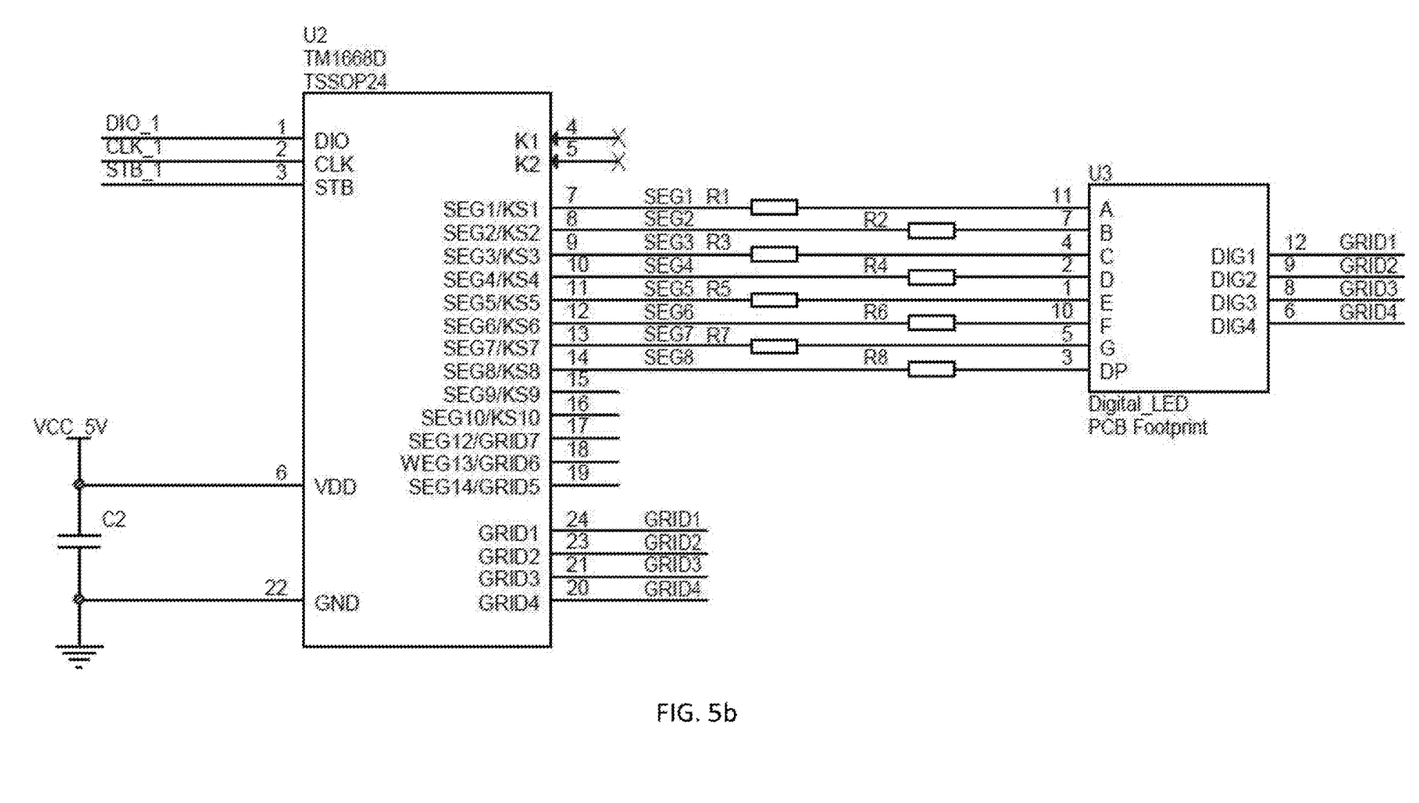
FIG. 5b is a circuit diagram of the second part of a segment display circuit according to an embodiment.

In one embodiment, as shown in FIG. 5b, the pin 17 of the main control chip U4 receives a signal from the output pin NO1 (pin 8) of the switch chip U1 and sends the signal to the segment display driving module 330 through a serial interface including pins DIO, CLK and STB of the main control chip U4. The segment display driving module 330 is used to drive the segment display 260.

Figure 5C:
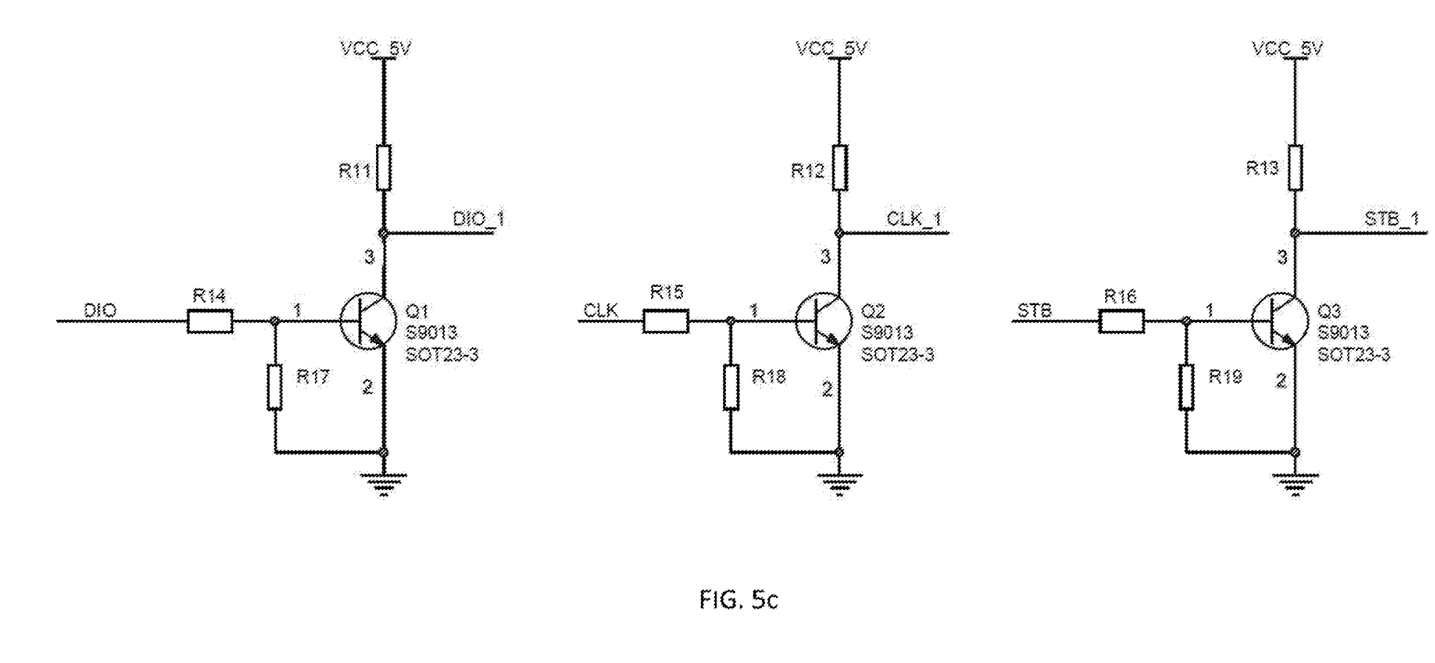
FIG. 5c is a circuit diagram of a 3.3 v/5 v voltage conversion circuit of a segment display circuit according to an embodiment.

In one embodiment, the pins DIO, CLK and STB of the main control chip U4 are connected tote segment display driving chip U2 by the DIO_1/CLK_1/STB_1 pins through the voltage conversion circuit (3.3V/5V voltage conversion) shown in FIG. 5c. The chip U2 is used to drive the segment display 260 (i.e., U3).

Figure 5D:
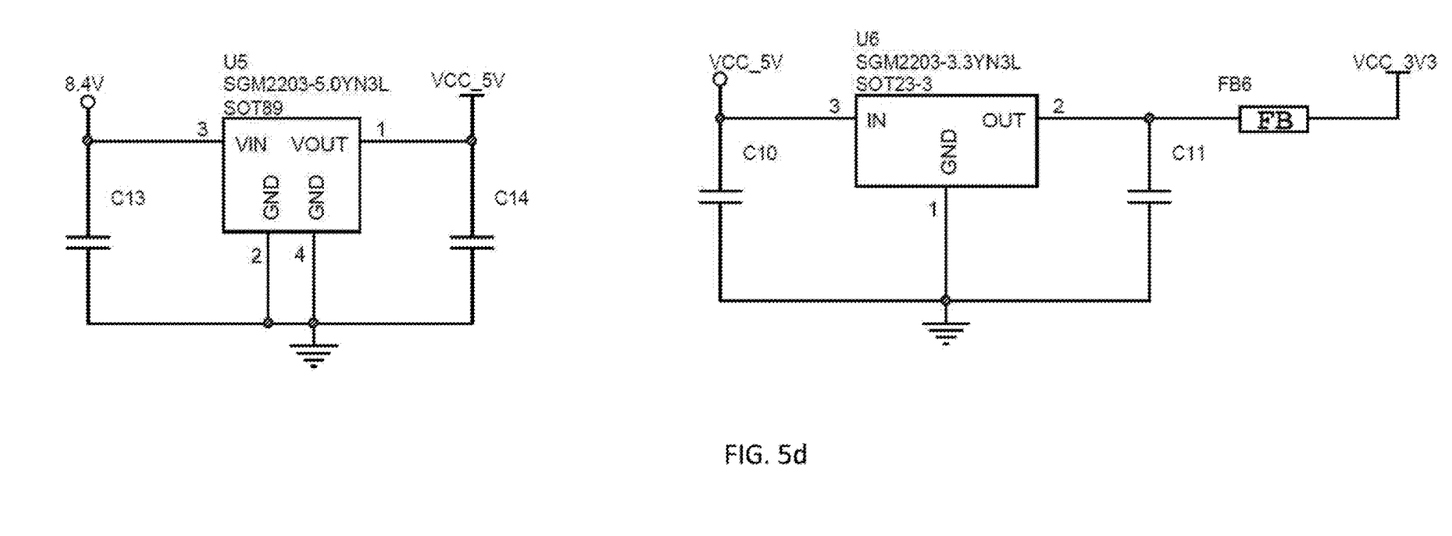
FIG. 5d is a circuit diagram of a power supply module of a segment display circuit according to an embodiment.

In one embodiment, as shown in FIG. 5d, the power supply module 350 includes a first voltage regulating chip U5 and a second voltage regulating chip U6 for converting 8.4 v voltage 5 v and 3.3 v so as to provide power for the switch chip U1, the main control chip U4 and the segment display driving chip U2 of the segment display driving module 330. It can provide power to the segment display device through the first circuit interface 311 and the second circuit interface 312.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A segment display device comprising:
   a housing comprising an upper cover and a lower cover connected to the upper cover, the upper cover defining a plurality of upper connection holes and a display window, the lower cover defining a plurality of lower connection holes at positions corresponding to the upper connection holes, the upper connection holes and the lower connection holes being configured for connecting the housing to a building block, and the housing defining an interface opening;
   a circuit board arranged within the housing and comprising a first circuit port and a second circuit port, the first circuit port and the second circuit port being located at the interface opening; and
   a segment display arranged on the circuit board at a position corresponding to the display window;
      wherein the segment display device is connected to the building block through a plurality of connection pins, each of the plurality of connection pins comprises a connecting shaft that comprises a stopper shoulder on a circumferential surface thereof along a circumferential direction thereof, the stopper shoulder is located between opposite ends of the connecting shaft, and one end of each of the plurality of connection pins is inserted into one of the upper connection holes or one of the lower connection holes, and the other end of each of the plurality of connection pins is configured to connect with the building block;
      a receiving space is formed between each upper connection hole and a lower connection hole corresponding to the upper connection hole, each of the plurality of connection pins comprises a projection at an end thereof that extends along a circumferential direction thereof, and the projection of each of the plurality of connection pins is received in one of the receiving spaces.

2. The segment display device of claim 1, wherein the interface opening comprises a first opening portion and a second opening portion, and the first circuit port and the second circuit port are respectively located at the first opening portion and a second opening portion.

3. The segment display device of claim 1, wherein the housing defines an indicator hole, a light guide is arranged in the indicator hole, and the circuit board comprises an indicator light that is arranged behind the light guide.

4. The segment display device of claim 1, wherein the circuit board comprises a segment display circuit that comprises a first circuit interface, a second circuit interface, an interface selection module, a segment display driving module, a segment display and a power supply module for supplying power to the segment display circuit, the first circuit interface and the second circuit interface are electrically connected to the interface selection module, the interface selection module and the segment display are both electrically connected to the segment display driving module, and the interface selection module is configured for determining whether to turn on the first circuit interface or the second circuit interface.

5. The segment display device of claim 4, wherein the interface selection module comprises a switch chip and a main control chip, the first circuit interface comprises a first data pin, the second circuit interface comprises a second data pin; the first data pin and the second data pin are respectively connected to two input pins of the switch chip, two enable pins and two output pins of the switch chip are connected to the main control chip; the first data pin and the second data pin are connected to the main control chip, and the main control chip is configured to control the switch chip to enable the two output pins according to the level signals of the first data pin and the second data pin.

6. The segment display device of claim 5, wherein the main control chip receives a signal from one output pin of the switch chip and sends the signal to the segment display driving module through a serial interface, and the segment display driving module is configured to drive the segment display.

7. The segment display device of claim 5, further comprising an indicator light module connected to the main control chip.

8. The segment display device of claim 5, wherein the power supply module comprises a first voltage regulating chip and a second voltage regulating chip for realizing voltage conversion, and supplies power for the switch chip, the main control chip and the segment display driving module.

9. A segment display device comprising:
   a housing comprising an upper cover and a lower cover connected to the upper cover, the upper cover defining a plurality of upper connection holes and a display window, the lower cover defining a plurality of lower connection holes at positions corresponding to the upper connection holes, the upper connection holes and the lower connection holes being configured for connecting the housing to a building block;
   a circuit board arranged within the housing and comprising a first circuit port and a second circuit port; and
   a segment display arranged on the circuit board at a position corresponding to the display window;
      wherein the segment display device is connected to the building block through a plurality of connection pins;
      a receiving space is formed between each upper connection hole and a lower connection hole corresponding to the upper connection hole, each of the plurality of connection pins comprises a projection at an end thereof that extends along a circumferential direction thereof, and the projection of each of the plurality of connection pins is received in one of the receiving spaces.

* * * * *